US009166490B2

(12) United States Patent
Yu et al.

(10) Patent No.: US 9,166,490 B2
(45) Date of Patent: Oct. 20, 2015

(54) DRIVING CONTROLLER AND FULL-BRIDGE CONVERTING CIRCUIT

(75) Inventors: Chung-Che Yu, New Taipei (TW); Shian-Sung Shiu, New Taipei (TW); Li-Min Lee, New Taipei (TW)

(73) Assignee: GREEN SOLUTION TECHNOLOGY CO., LTD., New Taipei (TW)

( * ) Notice: Subject to any disclaimer, the term of this patent is extended or adjusted under 35 U.S.C. 154(b) by 928 days.

(21) Appl. No.: 13/366,358

(22) Filed: Feb. 6, 2012

(65) Prior Publication Data

US 2012/0229034 A1 Sep. 13, 2012

(30) Foreign Application Priority Data

Mar. 8, 2011 (TW) .............................. 100107634 A

(51) Int. Cl.
H05B 37/00 (2006.01)
H02M 3/337 (2006.01)
H05B 33/08 (2006.01)
H02M 3/335 (2006.01)
H02M 1/00 (2007.01)

(52) U.S. Cl.
CPC ......... H02M 3/3376 (2013.01); H05B 33/0815 (2013.01); H05B 33/0848 (2013.01); H02M 3/33576 (2013.01); H02M 2001/0058 (2013.01); Y02B 20/348 (2013.01); Y02B 70/1433 (2013.01); Y02B 70/1491 (2013.01)

(58) Field of Classification Search
CPC . F21S 4/001; A47G 33/0809; A47G 33/0818; H02M 3/156; H02M 3/1588; Y02B 70/1466
USPC ............ 315/186, 209 R, 224, 225, 291, 121, 315/192; 323/271, 272, 282; 363/17; 327/84, 423, 588
See application file for complete search history.

(56) References Cited

U.S. PATENT DOCUMENTS

| 6,466,458 | B2 | 10/2002 | Zhang et al. |
| 6,744,649 | B1 | 6/2004 | Yang et al. |
| 7,158,390 | B2* | 1/2007 | Choi et al. ...................... 363/17 |
| 7,545,369 | B1* | 6/2009 | Lan et al. ..................... 345/204 |
| 7,782,100 | B2 | 8/2010 | Steuber et al. |
| 2004/0100805 | A1* | 5/2004 | Wei et al. ........................ 363/16 |
| 2010/0014321 | A1* | 1/2010 | Won et al. ...................... 363/17 |
| 2010/0172157 | A1* | 7/2010 | Chen et al. ................. 363/21.02 |

FOREIGN PATENT DOCUMENTS

| CN | 1109654 A | 10/1995 |
| CN | 101102632 A | 1/2008 |
| CN | 101304216 A | 11/2008 |
| CN | 100499334 C | 6/2009 |
| CN | 101510723 A | 8/2009 |
| CN | 101577494 A | 11/2009 |
| CN | 201557292 U | 8/2010 |
| TW | 466819 | 12/2001 |
| TW | 200537407 A | 11/2005 |

* cited by examiner

Primary Examiner — Lincoln Donovan
Assistant Examiner — Thomas Skibinski
(74) Attorney, Agent, or Firm — CKC & Partners Co., Ltd.

(57) ABSTRACT

The present invention provides a full-bridge driving controller and a full-bridge converting circuit, which have the function of soft switch, to provide a DC output voltage. The present invention employs a resonant unit to oscillate the current flowing through the converting circuit at a resonant frequency. The full-bridge driving controller switches four full-bridge transistor switches at an operating frequency higher than the resonant frequency, so as to achieve the function of soft switch.

19 Claims, 9 Drawing Sheets

DRIVING CONTROLLER AND FULL-BRIDGE CONVERTING CIRCUIT

RELATED APPLICATIONS

This application claims priority to Taiwan Application Serial Number 100107634, filed Mar. 8, 2011, which is herein incorporated by reference.

BACKGROUND

1. Technical Field

The present invention relates to a full-bridge driving controller and a full-bridge converting circuit, and more particularly relates to a full-bridge driving controller and a full-bridge converting circuit having the function of soft switch.

2. Description of Related Art

Types of conventional DC to DC converting circuit comprise a step-up converting circuit, a step-down converting circuit, a flyback converting circuit, a forward converting circuit, a half-bridge converting circuit and a full-bridge converting circuit, etc.

FIG. 1 is a schematic diagram of a conventional full-bridge converting circuit. The full-bridge converting circuit comprises a first transistor switch M1, a second transistor switch M2, a third transistor switch M3, a fourth transistor switch M4, a transformer T, a first rectification diode D1, a second rectification diode D2, an inductance L and an output capacitance Co. Each of the first transistor switch M1 and the third transistor switch M3 has one terminal coupled to an input power source VIN and another terminal coupled to two terminals of a primary side of the transformer T respectively. Each of the transistor switch M2 and the fourth transistor switch M4 has one terminal grounded and another terminal coupled to two terminals of the primary side of the transformer T respectively. Two terminals of a secondary side of the transformer T are coupled to the first rectification diode D1 and the second rectification diode D2, thereby storing rectified electric power in the inductance L and the output capacitance Co. The switching operations of the aforementioned four transistor switches M1, M2, M3 and M4 are controlled by a first control signal S1, a second control signal S2, a third control signal S3 and a fourth control signal S4 respectively. FIG. 2 is a schematic switching timing diagram of the transistor switches of the full-bridge converting circuit shown in FIG. 1. A phase of the first control signal S1 is equal to that of the fourth control signal S4, and a phase of the first control signal S2 is also equal to that of the fourth control signal S3. Therefore, the first transistor switch M1 and the fourth transistor switch M4 are turned on at the same time to provide a conduction path from the input power source VIN through the first transistor switch M1, the primary side of the transformer T, and the fourth transistor switch M4 to the ground. At this time, the secondary side of the transformer T generates an induced current flowing from the first transistor D1 through the inductance L to the output capacitance Co, and thus an electric power is stored in the inductance L and the output capacitance Co. When the second transistor switch M2 and the third transistor switch M3 are turned on, another conduction path is also provided from the input power source VIN through the third transistor switch M3, the primary side of the transformer T and the second transistor switch M2 to the ground. At this time, the secondary side of the transformer T generates an induced current flowing through the second transistor D2, the inductance L and the output capacitance Co for storing electric power.

Although a conversion efficiency of the switching converting circuit is high, yet a conduction loss or a switching loss, etc. still occurs in an actual operation. Under the global trend of energy-saving and carbon reduction in the current stage, many countries have legislated energy efficiency regulations or announced energy efficiency certifications, such as 80 plus certification in U.S. The requirements for conversion efficiency in the regulations or certifications are hard to be complied by the conventional converting circuits. Therefore, how to increase the conversion efficiency of the switching converting circuit is one of the most important issues presently.

SUMMARY

In view of the conversion efficiency of the conventional converting circuits failing to comply with the conversion efficiency regulations or pass certain conversion efficiency certifications. The present invention improves a converting circuit to reduce a switching loss by zero voltage switching or zero current switching, so as to upgrade the conversion efficiency thereof to comply with the requirements in these regulations and certifications.

To accomplish the aforementioned and other objects, an exemplary embodiment of the present invention provides a full-bridge converting circuit adapted to provide a DC output voltage. The full-bridge converting circuit comprises a resonant unit, a first transistor switch, a second transistor switch, a third transistor switch, a fourth transistor switch, a rectification unit and a full-bridge driving controller. The resonant unit has a primary side and a secondary side. The first transistor switch is coupled to an input power source and a first terminal of the primary side. The second transistor side is coupled to the first terminal of the primary side and a common potential. The third transistor switch is coupled to the input power source and a second terminal of the primary side. The fourth transistor switch is coupled to the second terminal of the primary side and the common potential. The rectification is coupled to the secondary side of the resonant unit to rectify a power of the resonant unit and output a DC output voltage. The full-bridge driving controller switches the first transistor switch, the second transistor switch, the third transistor switch and the fourth transistor switch at an operating frequency, wherein the first transistor switch and the second transistor switch are turned on at different time periods and the third transistor switch and the fourth transistor switch are turned on at different time periods, and the operating frequency is higher than a resonant frequency of the resonant unit.

The present invention also provides a full-bridge driving controller which comprises a feedback control circuit and a full-bridge driving circuit. The feedback control circuit generates a pulse width control signal according to a feedback detection signal. The full-bridge driving circuit generates a first control signal, a second control signal, a third control signal and a fourth control signal according to the pulse width control signal, which are respectively used to switch a first transistor switch, a second transistor switch, a third transistor and a fourth transistor switch of a full-bridge switching circuit. The first transistor switch and the fourth transistor switch determine a first conduction path and the second transistor switch, and the third transistor switch determine a second conduction path. The first transistor switch and the second transistor are connected in series between an input power source and a common potential. The third transistor switch and the fourth transistor switch are connected in series between the input power source and the common potential. The full-bridge driving circuit turns on one of the second transistor switch and the third transistor switch after the first conduction path is cut off, and turns on one of the first transistor switch and the fourth transistor switch after the second conduction path is cut off. The first transistor switch and the second transistor switch are turned on at different time periods and the second transistor switch and the third transistor switch are turned on at different time periods.

The present invention also provides a full-bridge driving controller which comprises a feedback control circuit, a frequency generator and a full-bridge driving circuit. The feedback control circuit is used to generate a pulse width control signal according to a feedback detection signal, and the frequency generator is used to generate a clock signal. The full-bridge driving circuit is used to generate a first control signal, a second control signal, a third control signal and a fourth control signal according to the pulse width control signal and the clock signal, which are respectively used to control a first transistor switch, a second transistor switch, a third transistor switch and a fourth transistor of a full-bridge switching circuit. The first transistor switch and the fourth transistor switch determine a first conduction path, and the second transistor and the third transistor switch determine a second conduction path. The first transistor switch and the second transistor are connected in series between an input power source and a common potential. The third transistor switch and the fourth transistor switch are connected in series between the input power source and the common potential. The full-bridge driving circuit turns on one of the second transistor switch and the third transistor switch after the first conduction path is cut off, and turns on one of the first transistor switch and the fourth transistor switch after the second conduction path is cut off. The first transistor switch and the second transistor switch are turned on at difference time periods, and the second transistor switch and the third transistor switch are turned on at difference time periods.

It is to be understood that both the foregoing general description and the following detail description are exemplary, and are intended to provide further explanation of the present invention as claimed. In order to make the features and the advantages of the present invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DETAILED DESCRIPTION

Figure 1:
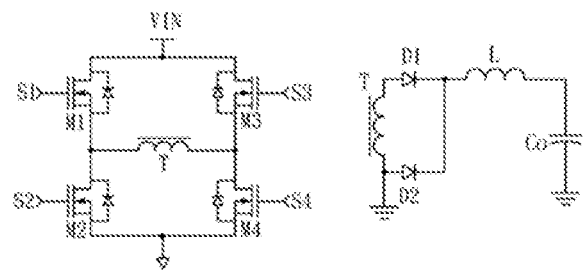
FIG. 1 is a schematic diagram of a conventional full-bridge converting circuit.
Figure 2:
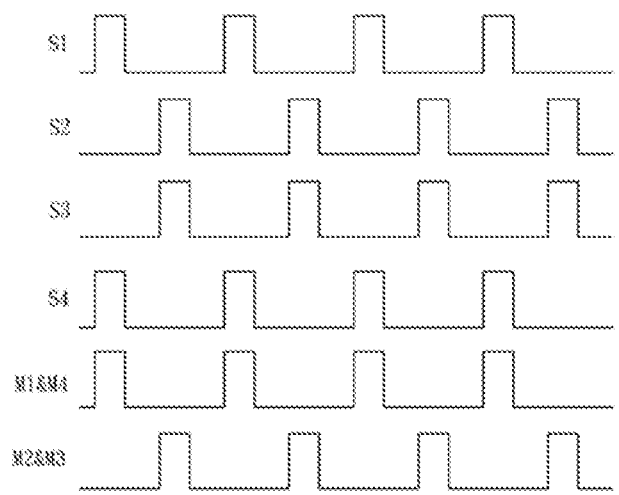
FIG. 2 is a schematic switching timing diagram of transistors of the full-bridge converting circuit shown in FIG. 1.

In the following detail description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

FIG. 3(a) to FIG. 3(d) are schematic switching timing diagrams of transistors in a primary side of the full-bridge converting circuit according to a first embodiment of the present invention. The primary side of the full-bridge converting circuit comprises a first transistor switch M1, a second transistor switch M2, a third transistor switch M3, a fourth transistor switch M4, and a primary side of a resonant unit, a primary side of a transformer T and a resonant capacitance Cr. A first control signal S1, a second control signal S2, a third control signal S3 and a fourth control signal S4 are used to respectively control the switching operations of the first transistor switch M1, the second transistor switch M2, the third transistor switch M3 and the fourth transistor switch M4, wherein a frequency of the control signals S1 to S4 is higher than a resonant frequency of the resonant unit.

Referring to FIG. 3(a), the first transistor switch M1 and the fourth transistor switch M4 are turned on to form a first conduction path, and the second transistor switch M2 and the third transistor switch M3 are turned off. At this time, a current of an input power source VIN flows through the first transistor switch M1, the primary side of the resonant unit, the fourth transistor switch M4 to the ground, that is, the current direction is from a first input terminal L1 to a second input terminal L2. Referring to FIG. 3(b), the first transistor switch M1 and the fourth transistor switch M4 are turned off and thus the first conduction path is cut off, while the second transistor switch M2 and the third transistor switch M3 are still turned off. The resonant unit has an inductance characteristic of resisting changes in the current, and thus the current of the resonant unit keeps flowing from the first input terminal L1 to the second input terminal L2 through body diodes of the second transistor switch M2 and the third transistor switch M3. Referring to the FIG. 3(c), the voltages across the second transistor switch M2 and the third transistor switch M3 are kept at a negative value of the forward biased voltage (very close to zero) of the diode due to that the body diodes of the second transistor switch M2 and the third transistor switch M3 are turned on. At this time, the second transistor switch M2 and the third transistor switch M3 are turned on to provide a second conduction path for applying the input power source VIN to the resonant unit. Then, the flowing direction of the current is changed to a direction from the second input terminal L2 to the first input terminal L1. The first transistor switch M1 and the fourth transistor switch M4 are turned off. Referring to FIG. 3(d), the second transistor switch M2 and the third transistor switch M3 are turned off, and thus the second conduction path is cut off. At this time, the first transistor switch M1 and the fourth transistor switch M4 are still turned off. The current of the resonant unit keeps flowing from the second input terminal L2 to the first input terminal L1 through the body diodes of the fourth transistor switch M4 and the first transistor switch M1. Referring back to FIG. 3(a), the first transistor switch M1 and the fourth transistor switch M4 are turned on to form a first conduction path while the second transistor switch M2 and the third transistor switch M3 are turned off. Afterward, the switching operation of the full-bridge transistor switch is performed in a cycle as described above.

The frequencies of four control signals S1 to S4 are higher than the resonant frequency of the resonant unit, thus ensuring that each one of the first transistor switch M1, the second transistor switch M2, the third transistor switch M3 and the fourth transistor switch M4 are turned on while the current still flows through the body diode thereof (so as to keep a voltage thereacross at the forward biased voltage). That is, the transistor switches are turned on by zero voltage switch to decrease the switching loss thereof.

Figure 3:
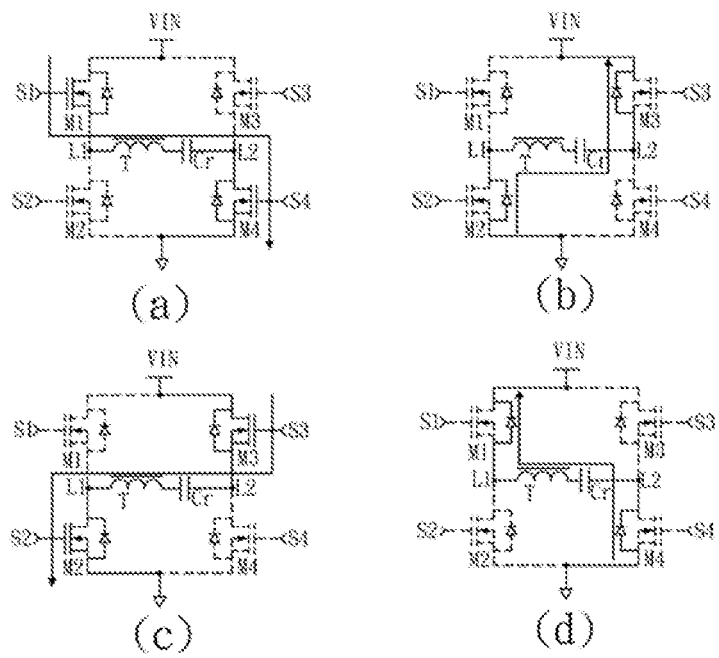
FIG. 3(a) to FIG. 3(d) are schematic switching timing diagrams of transistors in a primary side of the full-bridge converting circuit according to a first embodiment of the present invention.
Figure 4:
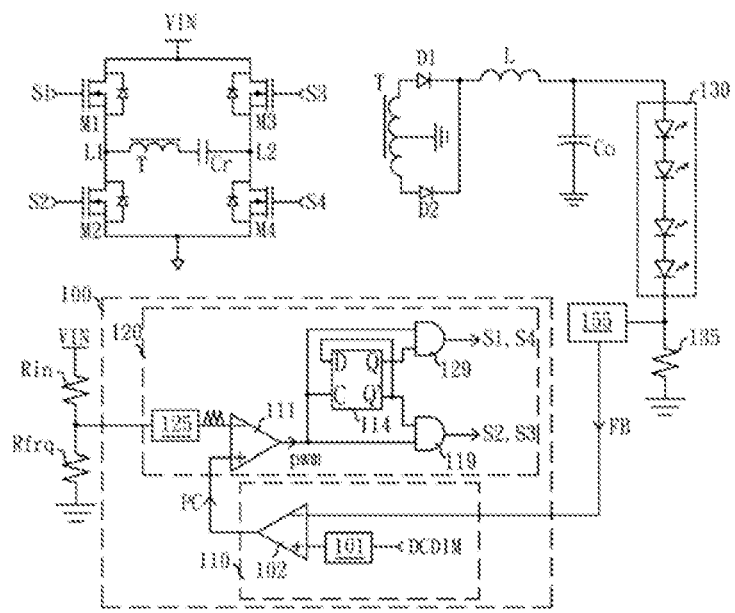
FIG. 4 is a schematic diagram of the full-bridge converting circuit with switching timing shown in FIG. 3.

FIG. 4 is a schematic diagram of the full-bridge converting circuit with the switching timing shown in FIG. 3. The full-bridge converting circuit adapted to provide a DC output voltage, and comprises a resonant unit, a full-bridge switching circuit, a rectification unit and a full-bridge driving controller 100. The full-bridge switching circuit comprises a first transistor switch M1, a second transistor switch M2, a third transistor switch M3 and a fourth transistor switch M4. The first transistor switch M1 and the fourth transistor switch M4 determine a first conduction path, and the second transistor switch M2 and the third transistor switch M3 determine a second conduction path. The resonant unit has a primary side comprising a resonant capacitance Cr and a primary side of a transformer T, and a secondary side comprising a secondary side of the transformer T and a resonant inductance L. The rectification unit comprises a first rectification diode D1 and a second rectification diode D2. One terminal of the first transistor switch M1 is coupled to an input power source VIN, and another terminal thereof is coupled to a first input terminal L1 of the primary side of the resonant unit. One terminal of the transistor switch M2 is coupled the first input terminal L1 of the primary side of the resonant unit, and another terminal thereof is coupled to a common potential. In the present embodiment, the common potential is zero potential (i.e., ground). Therefore, the first transistor switch M1 and the second transistor switch M2 are connected in series between the input power source VIN and the common potential. One terminal of the transistor switch M3 is coupled to the input power source VIN, and another terminal thereof is coupled to a second input terminal L2 of the primary side of the resonant unit. One terminal of the fourth transistor switch M4 is coupled to the second input terminal L2 of the primary side of the resonant unit, and another terminal thereof is coupled to the common potential. Therefore, the third transistor switch M3 and the fourth transistor switch M4 are connected in series between the input power source VIN and the common potential. The resonant capacitance Cr and the primary side of the transformer T are connected in series between the first input terminal L1 and the second input terminal L2. The positive terminals of the first rectification diode D1 and the second rectification diode D2 are respectively coupled to the two terminals of the secondary side of the transformer T, and the negative terminals thereof are coupled to the resonant inductance L. A center tap of the secondary side of the transformer T is grounded. Besides, the rectification unit comprises an output capacitance Co used to smooth the DC output voltage for driving a load 130. In the present embodiment, the load 130 is an LED module. A current detecting resistance 135 is coupled to the load 130 to generate a feedback detection signal FB indicative of an amount of the current flowing through the load 130, which is transmitted to the full-bridge driving controller 100 by an isolating circuit 155. The full-bridge driving controller 100 adjusts duty cycles of the control signals S1 to S4 according to the feedback detection signal FB, and modulates an amount of the power supplied to the load 130 by switching the transistor switches M1 to M4. The isolating circuit 155 may be added or omitted according to the actual application of the circuit, and other embodiments of the present invention described below also have the similar addition or omission.

The full-bridge driving controller 100 comprises a feedback control circuit 110 and a full-bridge driving circuit 120. The feedback control circuit 110 is used to generate a pulse width control signal PC according to the feedback detection signal FB. The full-bridge driving circuit 120 is used to generate a first control signal S1, a second control signal S2, a third control signal S3 and a fourth control signal S4 according to the pulse width control signal PC, so as to respectively switch the first transistor switch M1, the second transistor switch M2, the third transistor switch M3 and the fourth transistor switch M4. The feedback control circuit 110 comprises a reference voltage adjust circuit 101 and an error amplifier 102. The reference voltage adjust circuit 101 receives a DC dimming signal DCDIM to generate a reference voltage responsive to the level of the DC dimming signal DCDIM. The reference voltage is transmitted to a non-inverting input terminal of the error amplifier 102, and an inverting input terminal of the error amplifier 102 receives the feedback detection signal FB, and the pulse width control signal PC is generated accordingly. Due to that a level of the reference voltage signal is adjusted according to the DC dimming signal DCDIM, a level of the pulse width control signal PC is also adjusted according to the DC dimming signal DCDIM, thereby controlling the amount of the current flowing through the diode in the load 130 to perform a dimming function The full-bridge driving circuit 120 comprises a frequency generator 125, a comparator 111, a D-type flip-flop 114 and AND gates 119 and 129. The frequency generator 125 is coupled to a frequency set unit Rfrq, and adjusts the frequency of the clock signal according to the frequency set unit Rfrq. In the present embodiment, the frequency set unit Rfrq is a resistance, and the frequency generator 125 is a ramp generator, and the clock signal is a ramp signal. The full-bridge driving controller 100 further comprises an input voltage detecting circuit Rin coupled to the frequency generator 125 and the input power source VIN. The frequency generator 125 can adjust an amplitude of the ramp signal according to an level of the input power source VIN. In the present embodiment, the input voltage detecting circuit Rin is a resistance. A non-inverting input terminal of the comparator 111 receives the pulse width control signal PC, and an inverting terminal thereof receives the ramp signal, and a pulse width modulation signal pwm is generated accordingly. An input terminal C of the D-type flip-flop 114 receives the pulse width modulation signal pwm, and an input terminal D thereof is coupled to an inverting output terminal Q' thereof. The AND gate 119 is coupled to an output terminal of the comparator 111 and the inverting output terminal Q' of the D-type flip-flop 114, and the AND gate 129 is coupled to the output terminal of the comparator 111 and an output terminal Q of the D-type flip-flop 114. When an odd number of time of the pulse width modulation signal pwm is at a high level, the output terminal Q of the D-type flip-flop 114 outputs a high-level signal and the inverting output terminal Q' outputs a low-level signal. Therefore, the AND gate 129 generates the first control signal S1 and the fourth control signal S4 according to the duty cycle of the pulse width modulation signal pwm. When an even number of time of the pulse width modulation signal pwm is at the high level, the output terminal Q of the D-type flip-flop 114 outputs a low-level signal and the inverting output terminal Q' thereof outputs a high-level. Therefore, the AND gate 119 generates the second control signal S2 and the third control signal S3 according to the duty cycle of the pulse width modulation signal pwm. The D-type flip-flop 114 has a function of frequency dividing to make the frequency of the control signals S1 to S4 as one half of the frequency of the ramp signal generated by the frequency generator 125. Users can adjust the resistance value of the frequency set unit Rfrq according to the resonant frequency of the resonant unit to make the frequency of the control signals S1 to S4 higher than the resonant frequency. Therefore, the transistor switches M1 to M4 are turned on when the body diodes are kept under the forward biased state. A preferable set of the frequency is that the frequency of the control signals S1 to S4 is a little higher than the resonant frequency, so as to turn the transistor switches M1 to M4 on while the current of the resonant unit is relatively small for further decreasing the switching loss thereof. It can be ensured by the present invention that the control signals S1, S4 and the control signals S2, S3 are not generated at the same period due to the phases of the output signals of the output terminal Q and the inverting output terminal Q' of the D-type flip-flop 114 are opposite. Therefore, the first transistor switch M1 and the second transistor switch M2 are surely turned on during different periods, as well as the third transistor switch M3 and the fourth transistor switch M4.

Besides, the full-bridge driving controller 100 is capable of performing feed forward control by using the input voltage detecting circuit Rin for modulating in response to the input power source VIN. In the present embodiment, the amplitude of the ramp signal of the frequency generator 125 is increased with the increase of the voltage of the input power source VIN. Hence, the full-bridge driving controller 100 adjusts transient response in response to the voltage of the input power source VIN. Under the same loading (output power request), and the duty cycles of the control signals S1 to S4 generated by the full-bridge driving control 100 is reduced with the increasing voltage of the input power source VIN. Furthermore, by adjusting the amplitude of the ramp signal, a range of the level change of the pulse width control signal PC between dimming ON and OFF is substantially the same regardless of the voltage of the input power source VIN. Therefore, the full-bridge driving controller 100 of the present invention achieves the object of compensating the difference of the voltage of the input power source VIN by the feed forward control.

FIG. 5(a) to FIG. 5(h) are schematic switching timing diagrams of transistors in a primary side of the full-bridge converting circuit according to a second embodiment of the present invention. Compared with the embodiment shown in the FIG. 3, the turned on and off time points of a first transistor switch M1 and the fourth transistor switch M4 of the first conduction path, and those of the second transistor switch M2 and the third transistor switch M3 of a second conduction path are different in the present embodiment. The embodiment can still achieve the advantage of the zero voltage switching. The detail explanation is described in the following.

Figure 5:
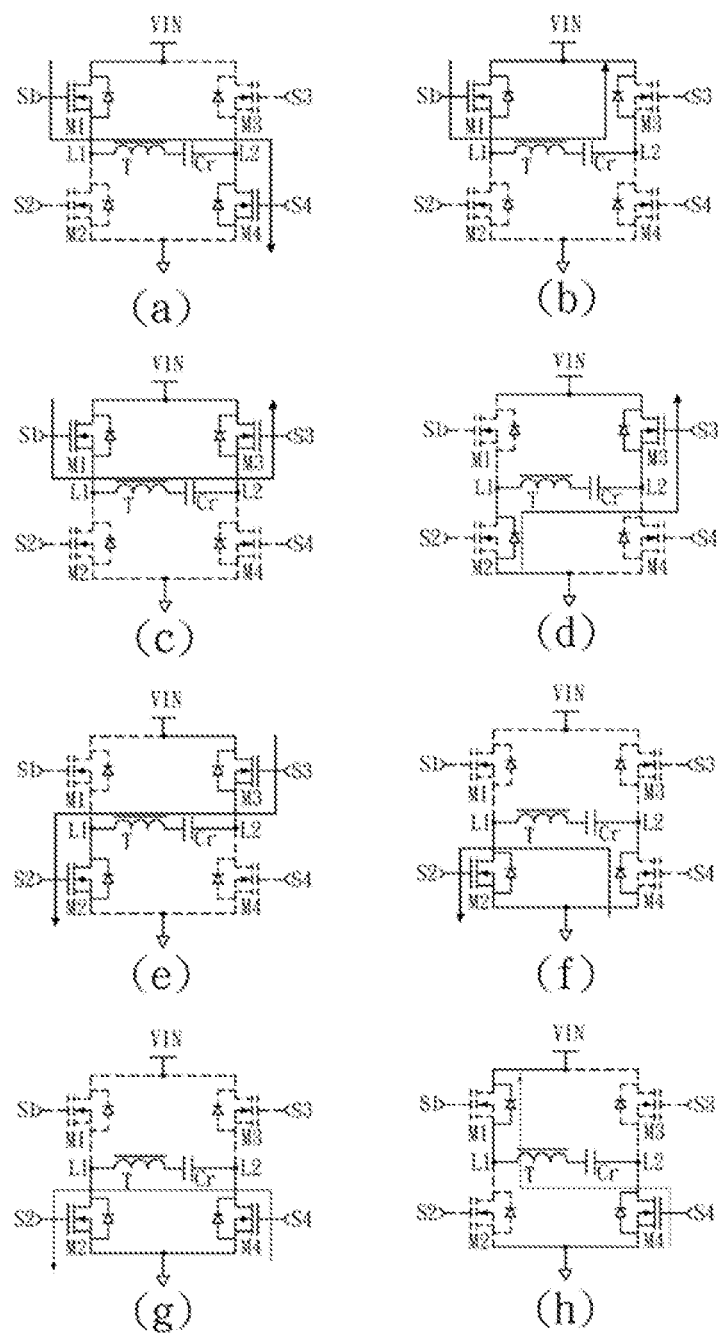
FIG. 5(a) to FIG. 5(h) are schematic switching timing diagrams of transistors in a primary side of the full-bridge converting circuit according to a second embodiment of the present invention.

Referring to the FIG. 5(a), the first transistor switch M1 and the fourth transistor switch M4 are turned on to provide a first conduction path, while the second transistor switch M2 and the third transistor switch M3 are turned off. At this time, a current from the input power source VIN flows through the first transistor switch M1, a primary side of a resonant unit, the fourth transistor switch M4 to the ground, that is a direction of the current is from a first input terminal L1 to a second input terminal L2. Referring to the FIG. 5(b), the fourth transistor switch M4 is turned off while the first transistor switch M1 is still turned on. At this time, the current freewheels through a body diode of the third transistor switch M3. Referring to the FIG. 5(c), the third transistor switch M3 is turned on, and the current flows through the turned-on the third transistor switch M3. Due to that a voltage across drain-source of a transistor is lower than a voltage across a forward biased diode, the conduction loss is lowered in contrast with the embodiment shown in FIG. 3. Referring to the FIG. 5(d), the first transistor switch M1 is turned off and the current freewheels through the body diode of the second transistor switch M2. Referring to the FIG. 5(e), the second transistor switch M2 is turned on, and thus the current of the resonant unit flows the turned-on in place of the body diode thereof. Therefore, the conduction loss is lowered. At this time, the input power source VIN is applied to the resonant unit by the second conduction path, and then the direction of the current is changed from a direction which is from the first input terminal L1 to the second input terminal L2 into a direction which is from the second input terminal L2 to the first input terminal L1. Referring to the FIG. 5(f), and the third transistor switch M3 is turned off while the second transistor switch M2 is still turned on. At this time, the current of the resonant unit freewheels through a body diode of the fourth transistor switch M4. Referring to the FIG. 5(g), the fourth transistor switch M4 is turned on and the current flows through the turned-on the fourth transistor switch M4 so as to lower the conduction loss. Referring to the FIG. 5(h), the second transistor switch M2 is turned off and the current freewheels the body diode of the first transistor switch M1. Returning to the FIG. 5 (a), the first transistor switch M1 is turned on, and thus the current flows through the turned-on the first transistor switch M1 to lower the conduction loss. At this time, the input power source VIN is applied to the resonant unit, and then the direction of the current is changed from a direction which is from the first input terminal L1 to the second input terminal L2 into a direction which is from the second input terminal L2 to the first input terminal L1.

As mentioned above, the present embodiment can further decrease the power loss caused by the body diode to enhance the conversion efficiency of the full-bridge converting circuit. Besides the aforementioned switching sequence and switching circuit of the present invention can achieve the zero voltage switching by using other switching sequences. These switching sequences have to comply with switching rules as follows.

(1) During a period of converting from the first conduction path (the first transistor switch M1 and the fourth transistor switch M4 is turned on, and the second transistor switch M2 and the third transistor switch M3 are turned off) into the second conduction path (the second transistor switch M2 and the third transistor switch M3 is turned on and the first transistor switch M1 and the fourth transistor switch M4 is turned off),
i. firstly, one of the first transistor switch M1 and the fourth transistor switch M4 is turned off;

ii. secondly, the one of the second transistor switch M2 and the third transistor switch M3, which is connected in series with the turned-off one of the first transistor switch M1 and the fourth transistor switch M4, is turned on;

iii. thirdly, the other one of the first transistor switch M1 and the fourth transistor switch M4, i.e., the one which is not turned off yet, is turned off; and iv. finally, the other one of the second transistor M2 and the third transistor switch M3, i.e., the one which is not turned on yet, is turned on;

The foregoing step ii is used to avoid a short through issue of the two transistor switches connected in series, which may damage the transistor switch. Besides, the sequence of the step ii and the step iii can be exchanged mutually without influencing the soft switching function of the present invention.

(2) During a period of converting from the second conduction path into the first conduction path, i. firstly, one of the second transistor switch M2 and the third transistor switch M3 is turned off;

ii. secondly, the one of the first transistor switch M1 and the fourth transistor switch M4, which is connected in series with the turned-off one of the second transistor switch M2 and the third transistor switch M3, is turned on;

iii. thirdly, the other one of the second transistor switch M2 and the third transistor switch M3, i.e., the one which is not turned off yet, is turned off; and iv. Finally, the other one of the first transistor switch M1 and the fourth transistor switch M4, i.e., the one which is not turned on yet, is not turned on;

Similarly, the foregoing step ii is used to avoid a short through issue of the two transistor switches connected in series. Besides, the sequence of the step ii and the step iii can be exchanged mutually without influencing the soft switching function of the present invention.

Figure 6:
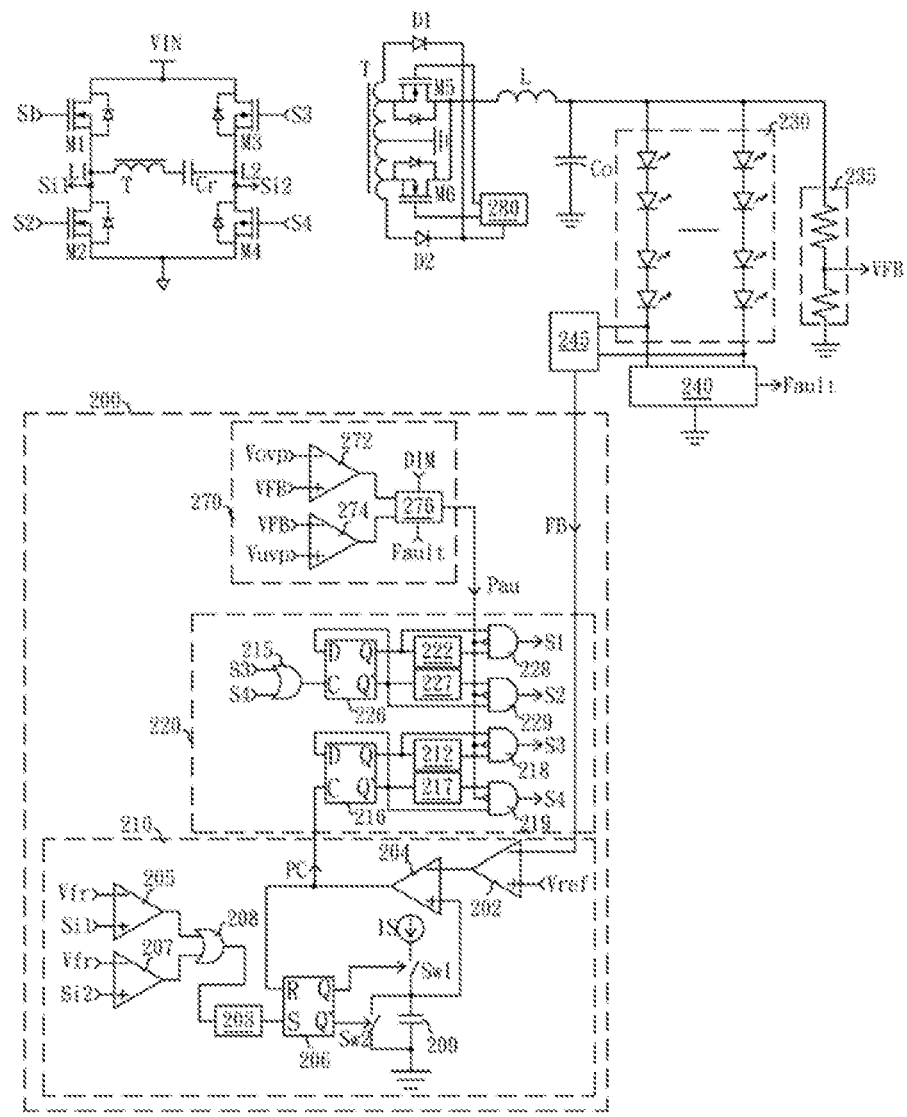
FIG. 6 is a schematic diagram of the full-bridge converting circuit with switching timing shown in FIG. 5.

FIG. 6 is a schematic diagram of the full-bridge converting circuit with the switching timing shown in FIG. 5. The full-bridge converting circuit, which comprises a resonant unit, a full-bridge switching circuit, a rectification unit and a full-bridge driving controller 200, is adapted to convert an input power source VIN into a DC output Voltage to drive an LED module 230. The full-bridge switching circuit comprises a first transistor switch M1, a second transistor switch M2, a third transistor switch M3 and a fourth transistor switch M4. The resonant unit comprises a primary side comprising a resonant capacitance Cr, a primary side of a transformer T, and a secondary side comprising a secondary side of the transformer T and a resonant inductance L. The rectification unit comprises a synchronous rectification controller 280, a first rectification diode D1, a second rectification diode D2, a fifth transistor switch M5, a sixth transistor switch M6 and an output capacitance Co. Please refer to the corresponding description with FIG. 4 for the connection relationship and the operation of the resonant unit and the full-bridge switching circuit, which is not described herein again. A connection relationship and an operation of the rectification unit is described as follows.

The fifth transistor switch M5 and the sixth transistor switch M6 which are the N-type MOSFETs are coupled to the winding of the secondary side of the transformer T to rectify and store the power in the inductance L and the output capacitance Co for driving the LED module 230 to emit light. The first rectification diode D1 and the second rectification diode D2 are coupled to an auxiliary winding of the secondary side of the transformer T respectively to provide a voltage higher than the voltage of the winding of the secondary side of the transformer T to the synchronous rectification controller 280. Thereby, the synchronous rectification controller 280 can generate synchronous signals with a sufficiently high level to turn on the fifth transistor switch M5 and the sixth transistor switch M6. In the present embodiment, the synchronous rectification controller 280 determines the turned-on and off time points of the fifth transistor switch M5 and the sixth transistor switch M6 according to a current of the secondary side of the transformer T which has been rectified by the first rectification diode D1 and the second rectification diode D2, thereby performing the function of synchronous rectification. Of course, the synchronous rectification controller 280 may determine the turned-off time points of the fifth transistor switch M5 and the sixth transistor switch M6 by detecting a current flowing through or a voltage across (a smaller voltage means a smaller current) the fifth transistor switch M5 and the sixth transistor switch M6. By the aforementioned controlling of synchronous rectification, the conversion efficiency of the full-bridge converting circuit may be further enhanced. The LED module 230 comprises a plurality of LED strings, wherein one terminal of each LED string is coupled to an output end of the rectification unit. A balance current 240 comprises a plurality of current balance terminals coupled to the other terminals of the LED strings for balancing currents flowing through the LED strings. A terminal voltage selecting element 245 is coupled to the plurality of current balance terminals of the current balance unit 240 and generates a feedback detection signal FB according to voltages of the plurality of the current balance terminals. In the present embodiment, the terminal voltage element 245 selects the one with the lowest voltage among the current balance terminals as the feedback detection signal FB.

The full-bridge driving controller 200 comprises a feedback control circuit 210 and a full-bridge driving circuit 220. The feedback control circuit 210 generates a pulse width control signal PC according to the feedback detection signal FB. The full-bridge driving circuit 220 generates a first control signal S1, a second control signal S2, a third control signal S3 and a fourth control signal S4 to switch the first transistor switch M1, the second transistor switch M2, the third transistor switch M3 and the fourth transistor switch M4 respectively. The feedback control circuit 210 comprises an error amplifier 202, a comparator 204, a resonant frequency detecting circuit and an on-time clocking circuit. An inverting terminal of the error amplifier 202 receives the feedback detection signal FB, and a non-inverting terminal thereof receives a reference voltage signal Vref, thereby generating an error amplified signal. An inverting input terminal of the comparator 204 receives the error amplified signal and a non-inverting input terminal is coupled an on-time clocking circuit, thereby generating the pulse width control signal PC.

The on-time clocking circuit, comprising a SR flip-flop 206, a capacitance 209, a current source IS and switches Sw1, Sw2, is used to clock turn-on periods of the first conduction path and the second conduction path in every cycle, and accordingly a timing signal is generated. The resonant frequency detecting circuit, comprising an one-shot circuit 203, comparators 205 and 207, and an OR gate 208, is coupled to the resonant unit to detect the resonant current of the resonant unit and determines which state of the resonant unit is and what an operating frequency of the full-bridge driving circuit 200 is. Hence, it can be ensured that the operating frequency of the full-bridge driving circuit 200 is higher than the resonant frequency of the resonant unit. An inverting input terminal of the comparator 205 is coupled to a frequency detection reference signal Vfr, and a non-inverting input terminal thereof is coupled to the first input terminal L1 of the resonant unit, thereby receiving a first frequency detection signal Si1. An inverting input terminal of the comparator 207 is coupled to the frequency detection reference signal Vfr, and a non-inverting input terminal thereof is coupled to the second input terminal L2 of the resonant unit, thereby receiving a second frequency detection signal Si2. The first frequency detection signal Si1 is generated by an on-resistance of the second transistor switch M2 when the current of the resonant flows through the second conduction path, and the second frequency detection signal Si2 is generated by an on-resistance of the fourth transistor switch M4 when the current of the resonant unit flows through the first conduction path. A default setting of the full-bridge driving controller 200 is to turn on the first conduction path at the beginning of the full-bridge converting circuit, i.e., outputting the first control signal S1 and the fourth control signal S4 at the beginning to turn on the first transistor switch M1 and the fourth transistor switch M4 respectively. At this time, a level of the second frequency detection signal Si2 starts rising. In the present embodiment, the frequency detection reference signal Vfr can be a lower voltage, and thus the current of the resonant unit can be immediately detected by the resonant frequency detecting circuit right after the current of the resonant unit starts rising. The comparator 207 outputs a high-level signal when a level of the second frequency detection signal Si2 is higher than that of the frequency detection reference signal Vfr. When receiving any output signal of the comparator 205, 207, The OR gate 208 outputs a high-level signal to trigger the one-shot circuit 203 to output a high-level signal to a set terminal S of the SR flip-flop 206. An inverting terminal Q' of the SR flip-flop 206 outputs a low-level to turn off the switch Sw2, and an output terminal Q thereof outputs a high-level signal to turn on the switch Sw1. At this moment, the current source IS in the on-time clocking circuit starts charging the capacitance 209 to generate a timing signal. The comparator 204 generates the pulse width control signal PC to make the full-bridge driving circuit 220 cut off the first conduction path and trigger the SR flip-flop 206 to turn off the switch Sw1 and turn on the switch Sw2 when a voltage level of the capacitance 209 is higher than the level of error amplified signal generated by error amplifier 202. Therefore, the capacitance 209 is discharged and reset. The full-bridge driving circuit 220 turns on the second transistor switch M2 and the third transistor switch M3 based on a preset switching sequence, so as to form the second conduction path. The level of the first frequency detection signal Si1 starts rising. The comparator 205 outputs a high-level signal to trigger the SR flip-flop 206 through the OR gate 208 and the one-shot circuit 203 to turn off the switch Sw2 and turn on the switch Sw1 when the level of the first frequency detection signal Si1 is higher than that of the frequency detection reference signal Vfr. At this moment, the current source IS charges the capacitance 209. When the voltage across the capacitance 209 is higher than the level of the error amplified signal generated by the error amplifier 202, the comparator 204 generates the pulse width control signal PC to make the full-bridge driving circuit 220 cut off the second conduction path. The pulse width control signal PC simultaneously triggers the SR flip-flop 206 to turn off the switch Sw1 and turn on the switch Sw2 to reset the capacitance 209.

The full-bridge driving circuit 220 comprises an OR gate 215, D-type flip-flops 216 and 226, delay circuits 212, 222, 217 and 227, and AND gates 218, 219, 228 and 229. The full-bridge driving circuit 220 turns on the transistor switches M1 to M4 to form the first conduction path and the second conduction path according to a preset switching sequence, and cuts off the first conduction path and the second conduction path according to the pulse width control signal PC. An input terminal C of the D-type flip-flop 216 is coupled to the feedback control circuit 210 to receive the pulse width control signal PC, and an inverting output terminal Q' thereof is coupled to an input terminal D thereof and the delay circuit 217, and the output terminal Q thereof is coupled to the delay circuit 212. The AND gate 219 is coupled to the delay circuit 217 and the inverting output terminal Q' of the D-type flip-flop 216, thereby generating the fourth control signal S4. The AND gate 218 is coupled to the delay circuit 212 and the output terminal Q of the D-type flip-flop 216, thereby generating the third control signal S3. The OR gate 215 is coupled to output terminals of the AND gates 218, 219, and an input terminal C of the D-type flip-flop 226 is coupled to an output terminal of the OR gate 215. An inverting output terminal Q' of the D-type flip-flop 226 is coupled to the input terminal D thereof and the delay circuit 227, and the output terminal Q thereof is coupled to the delay circuit 222. The AND gate 229 is coupled to the delay circuit 227 and the inverting output terminal Q' of the D-type flip-flop 226, thereby generating the second control signal S2. The AND gate 228 is coupled to the delay circuit 222 and the output terminal Q of the D-type flip-flop 226, thereby generating the first control signal S1.

The output terminals Q of the D-type flip-flops of the 216, 226 output low-level signals, and the inverting output terminal Q' thereof outputs high-level signals at the beginning of the full-bridge switching circuit operating. The delay circuits 217, 227 delay the signals outputted by the inverting output terminals Q of the D-type flip-flops 216, 226 respectively to the AND gates 219, 229, and then the AND gates 219, 229 outputs the fourth control signal S4 and the second control signal S2 to respectively turn on the fourth transistor switch M4 and the second transistor switch M2. After receiving the fourth control signal S4, the OR gate 215 triggers the D-type flip-flop 226 to output a high-level signal at the output terminal Q thereof and a low-level signal at the inverting output terminal Q' thereof. At this time, the OR gate 229 stops outputting the second control signal S2 to turn off the second transistor switch M2, and after a preset delay period due to the delay function of the delay circuit 222, the AND gate 228 generates the first control signal S1 to turn on the first transistor switch M1. By the aforementioned arrangement of the circuits, the turned-on time point of the first transistor switch M1 is certainly later than the turned-off time point of the second transistor switch M2 which has passed through the preset delay period (dead time). Then, the first conduction path is formed due to that the first transistor switch M1 and the fourth transistor switch M4 are turned on at the same time (referring to the FIG. 5 (a)). The current of the resonant unit flows from the first input terminal L1 to the second input terminal L2 and is increased gradually. When the feedback control circuit 210 outputs the pulse width control signal PC, the D-type flip-flop 216 is triggered to output a high-level signal at the output terminal Q and a low-level signal at the inverting output terminal Q'. At this time, the AND gate 219 stops outputting the fourth control signal S4 to turn off the fourth transistor switch M4 (referring to the FIG. 5(b)) first, and after a preset delay period of the delay circuit 212, the AND gate 218 generates the third control signal S3 to turn on the third transistor switch M3 (referring to the FIG. 5(c). By using the foregoing arrangement of the circuits, the turned-on time point of the third transistor switch M3 is later than the turned-off time point of the fourth transistor switch M4 which has passed through the preset delay period (dead time). When the OR gate 215 receives the third control signal S3, the OR gate 215 triggers the D-type flip-flop 226 to output a low-level signal at the output terminal Q and a high-level signal at the inverting output terminal Q'. At this time, the AND gate 228 stops outputting the first control signal S1 first to turn off the first transistor switch M1 (referring to the FIG. 5(d)), and after a preset delay period of the delay circuit 227, the AND gate 229 outputs the second control signal S2 to turn on the second transistor switch M2. At this time, the second conduction path is formed due to that the second transistor switch M2 and the third transistor switch M3 are turned on at the same time (referring to the FIG. 5(e)). By using the aforementioned arrangement of the circuits, the turned-on time point of the second transistor switch M2 is certainly later than the turned-off time point of the first transistor switch M1 which has passed through the preset delay period (dead time). When the feedback control circuit 210 outputs the pulse width control signal PC again, the D-type flip-flop 216 is triggered to output a low-level signal at the output terminal Q and a high-level signal at the inverting output terminal Q'. At this time, the AND gate 218 stops outputting the third control signal S3 to turn off the third transistor switch M3 (referring to the FIG. 5(f)), and after a preset delay period of the delay circuit 217, the AND gate 219 outputs the fourth control signal S4 to turn on the fourth transistor switch M4 (referring to the FIG. 5(g)). By the aforementioned arrangement of the circuits, the turned-on time point of the fourth transistor switch M4 is later than the turned-off time point of the third transistor switch M3 which has passed through the preset delay period (dead time). When the OR gate 215 receives the fourth control signal S4, the D-type flip-flop 226 is triggered to output a high-level signal at the output terminal Q and output a low-level signal at the inverting output terminal Q'. At this time, the AND gate 229 stops outputting the second control signal S2 to turn off the second transistor switch M2 (referring to the FIG. 5(h)), and after a preset delay period of the delay circuit 222, the AND gate 228 outputs the first control signal S1 to turn on the first transistor switch M1 (referring to the FIG. 5(a)).

The full-bridge driving controller 200 further comprises a protecting circuit 270, which forces the full-bridge driving controller 200 to enter a protection mode for avoiding possible circuit damages when any abnormal condition occurs. In the present embodiment, the protecting circuit 270 comprises comparators 272, 274 and a logic element 276. Besides, the protecting circuit 270 may add a voltage detecting circuit 235 (such as a voltage divider) coupled to the output capacitance Co and generates a voltage detection signal VFB according to the DC output voltage outputted by the full-bridge converting circuit. A non-inverting input terminal of the comparator 272 receives the voltage detection signal VFB, and an inverting input terminal thereof receives an over-high voltage judgment signal Vovp, thereby generating an over-high voltage protection signal. An inverting input terminal of the comparator 274 receives the voltage detection signal VFB and a non-inverting input terminal thereof receives an over-low voltage judgment signal Vuvp, thereby generating an over-low voltage protection signal. The logic element 276 generates and outputs a logic judgment signal Pau to the AND gates 218, 219, 228, 229 in the full-bridge driving circuit 220, so as to stop the full-bridge driving circuit 220 generating the first control signal S1, the second control signal S2, the third control signal M3 and the fourth control signal M4 when receiving one of the over-high voltage protection signal generated by the comparator 272 and the over-low voltage protection signal generated by the comparator 274 (i.e., the DC output voltage is higher than an over-high voltage value or lower than an over-low voltage value). At this time, the first transistor switch M1, the second transistor switch M2, the third transistor M3 and the fourth, transistor switch M4 are all turned off to stop transmitting the power to the secondary side of the resonant unit.

The logic element 276 may perform a protecting function or stops switching the power in response to an outer signal. For example, the current balance unit 240 can detect the state of each LED string in the LED module 230. The current balance unit 240 generates a fault signal Fault when any current of the LED strings is over-high or zero, or the voltage of the LED strings is over high caused by one of LED strings being open-circuited or short-circuited, or a LED string with too many damaged LED, etc. At this time, the logic element 276 also generates the logic judgment signal Pau. The logic element 276 keeps the full-bridge driving controller 200 under the protection mode for the protection state with respect to the over-high voltage protection signal, the over-low voltage protection signal and the fault signal until the full-bridge driving controller 200 is restarted. Therefore, the full-bridge driving controller 200 can avoid misjudgment due to abnormal condition being temporarily removed by stopping transmitting the power to the secondary side of the resonant unit. The logic element 276 may receive a dimming signal DIM to periodically stop and restore the transmission of the power to the secondary side of the resonant unit in response to the dimming signal DIM.

As mentioned above, the full-bridge driving circuit 220 conducts the first conduction path and the second conduction path according to the preset switching sequence and cuts off the first conduction path and the second conduction path according to the pulse width control signal PC. The full-bridge driving circuit 220 employs the set of preset delay period to certainly ensure that one of the first conduction path and the second conduction path is conducted after the preset period when the other one thereof is cut off. Besides, the preset delay period can be applied to the switching rule in the foregoing description. Therefore, one of the first transistor switch M1 and the second transistor switch M2 is turned on after a preset period when the other thereof is turned off, and one of the third transistor switch M3 and the fourth transistor switch M4 is turned on after a preset period when the other thereof is turned off. Besides, one of the second transistor switch M2 and the third transistor switch M3 is turned on after a preset period when the first conduction path is cut off, and one of the first transistor switch M1 and the fourth transistor switch M4 is turned on after a preset period when the second conduction path is turned off. Consequently, it can be ensured by the present invention that the four transistor switches M1 to M4 are turned on during the periods of the corresponding body diodes are forward biased.

FIG. 7(a) to FIG. 7(h) are schematic switching timing diagrams of transistors in a primary side of the full-bridge converting circuit according to a third embodiment of the present invention. In the present embodiment, the turned-on and turned-off timings of the first transistor switch M1 and the fourth transistor switch in the first conduction path and the second transistor switch M2 and the third transistor switch M3 in the second conduction path are adjusted under the switching rule in the foregoing description. The embodiment can still achieve the advantage of zero voltage switching and further achieve the advantage of zero current in some transistor switches. The explanation is described as follows.

Figure 7:
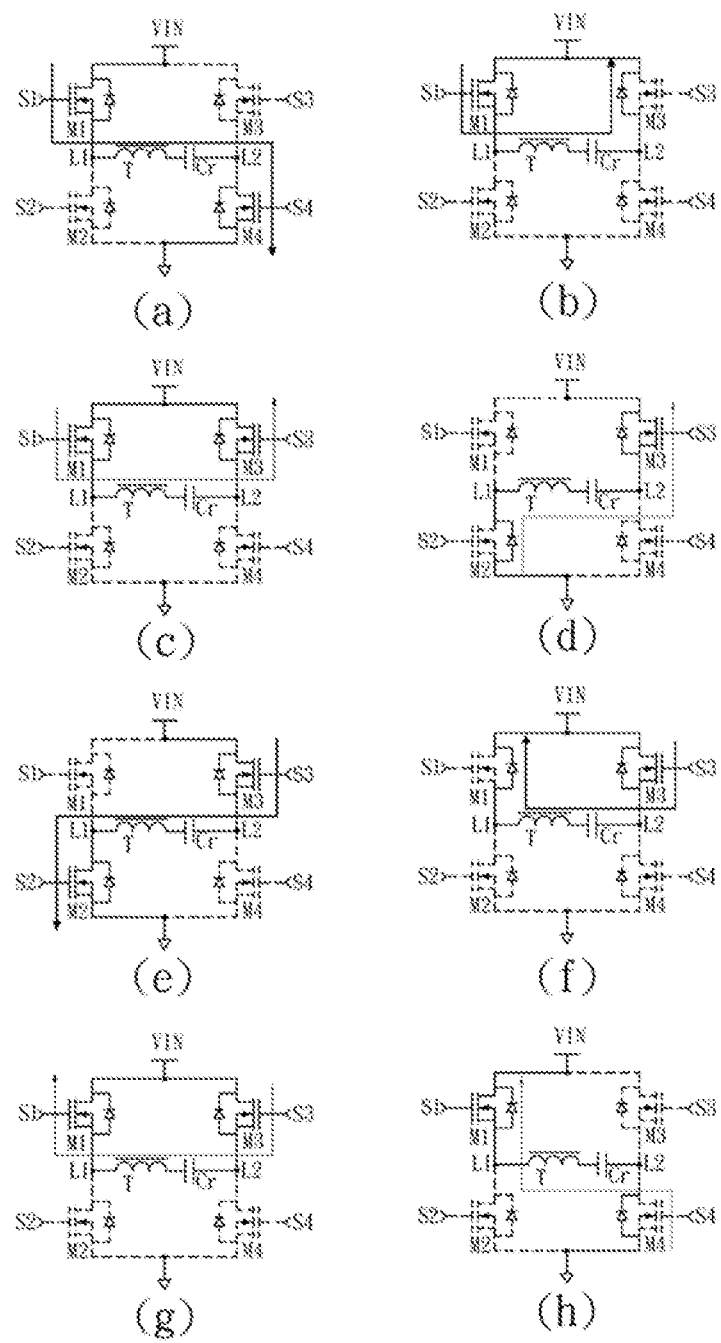
FIG. 7(a) to FIG. 7(h) are schematic switching timing diagrams of transistors in a primary side of the full-bridge converting circuit according to a third embodiment of the present invention.

Referring to the FIG. 7(a), the first transistor switch M1 and the fourth transistor switch M4 are turned on to form a first conduction path while the second transistor switch M2 and the third transistor switch M3 are turned off. At this time, the current flows from a first input terminal L1 into a second input terminal L2. Referring to the FIG. 7(b), the fourth transistor switch M4 is turned off first, and the first transistor switch M1 is still turned on. At this moment, the current of the resonant unit freewheels through a body diode of the third transistor switch M3. Referring to FIG. 7(c), the third transistor switch M3 is turned on, and thus the current of the resonant unit flows through the turned-on third transistor switch M3. Referring to FIG. 7(d), the first transistor M1 is turned off when the current (with the direction from the first input terminal L1 to the second input terminal L2) is close to zero but is still higher than zero. At this time, the turned-off switching of the first transistor switch M1 is almost equal to zero current switching. Then, the current of the resonant unit freewheels through a body diode of the second transistor switch M2. Referring to the FIG. 7(e), the second transistor switch M2 is turned on later when the current flows from the first input terminal L1 to the second input terminal L2, and thus the current of the resonant unit is changed to flow through the turned-on second transistor switch M2. At this time, the input power source VIN is applied to the resonant unit by the second conduction path, and thus the direction of the current is changed from a direction which is from the first input terminal L1 to the second input terminal L2 into a direction which is from the second input terminal L2 to the first input terminal L1. Referring to the FIG. 7(f), the second transistor switch M2 is turned off first, and the third transistor switch M3 is still turned on. At this moment, the current of the resonant unit freewheels through a body diode of the first transistor switch M1. Referring to the FIG. 7(g), the first transistor switch M1 is turned on, and thus the current of the resonant unit flows the turned-on first transistor switch M1. Referring to the FIG. 7(h), the third transistor M3 is turned off when the current with the direction which is from the second input terminal L2 to the first input terminal L1 is close to zero but is still higher than zero. At this time, the turned-off switching of the third transistor switch M3 is almost equal to zero current switching. Then, the current of the resonant unit freewheels through a body diode of the fourth transistor switch M4. Returning to the FIG. 7 (a), the fourth transistor switch M4 is turned on later and thus the current of the resonant unit flows through the fourth transistor switch M4. At this time, the input power source VIN is applied to the resonant unit via the first conduction path, and thus the direction of the current is changed from a direction which is from the second input terminal L2 to the first input terminal L1 into a direction which is from the first input terminal L1 to the second input terminal L2.

By adjusting the switching timing, the first transistor switch M1 and the third transistor switch M3 are turned off by zero current switching essentially. Therefore, the switching loss of the full-bridge switching circuit can be further decreased.

Figure 8:
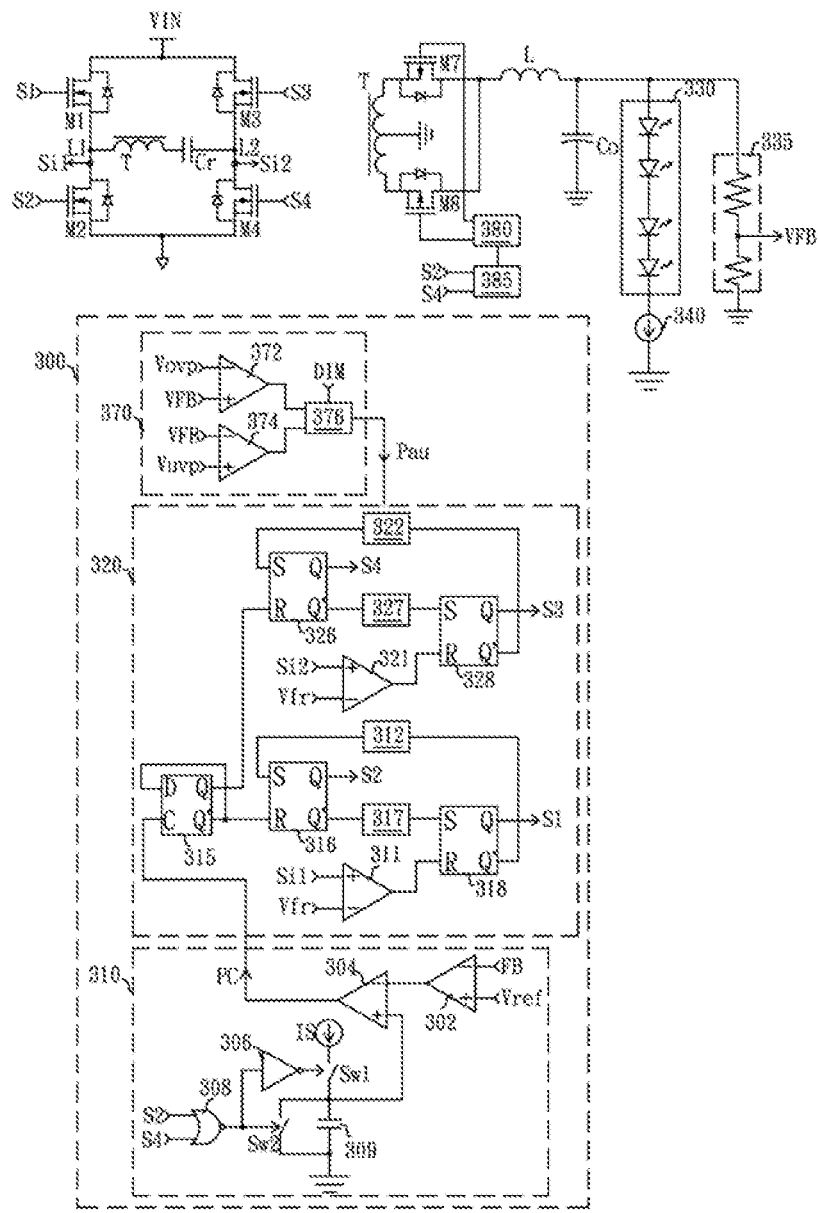
FIG. 8 is a schematic diagram of the full-bridge converting circuit with switching timing shown in FIG. 7.

FIG. 8 is a schematic diagram of the full-bridge converting circuit with switching timing shown in FIG. 7. The full-bridge converting circuit, which comprises a resonant unit, a full-bridge switching circuit, a rectification unit and a full-bridge driving controller 300, is adapted to convert an input power source VIN into a DC output voltage to provide the power demand of an LED module 330. The full-bridge switching circuit comprises a first transistor switch M1, a second transistor switch M2, a third transistor switch M3 and a fourth transistor switch M4. The resonant unit comprises a primary side comprising a resonant capacitance Cr, a primary side of a transformer T, and a secondary side comprising a secondary side of the transformer T and a resonant inductance L. The rectification unit comprises a synchronous rectification controller 380, an isolating circuit 385, a seventh transistor switch M7, an eighth transistor switch M8 and an output capacitance Co. Please refer to the corresponding description with FIG. 4 for the connection relationship and the operation of the resonant unit and the full-bridge switching circuit, which is not described again. A connection relationship and an operation of the rectification unit is described as follows.

The seventh transistor switch M7 and the eighth transistor switch M8 which are the P-type MOSFETs are coupled to the secondary side of the transformer T to synchronously rectify the power according to synchronous control signals generated by the synchronous rectification controller 380. The isolating circuit 385 receives a second control signal S2 and a fourth control signal S4 of the full-bridge driving controller 300 to generate and provide the synchronous rectified signals to the synchronous rectification controller 380 which generates the synchronous control signals to turn on and turn off the seventh transistor switch M7 and the eighth transistor switch M8. For example, when the second control signal S2 (or the fourth control signal S4) is at the high level, a corresponding one of the seventh transistor switch M7 and the eighth transistor switch M8 is turned off first and the other one thereof is turned on in a preset period to avoid a current of the inductance L flowing reversely through the seventh transistor switch M7 and the eighth transistor switch M8. The isolating circuit 385 can be an opto-coupler or a transformer, etc. The function of the isolating circuit 385 is to isolate the primary side and the secondary side of the transformer T, so as to comply with the safety compliances. The LED module 330 is coupled to a current source 340 so as to stabilize a current to flow therethrough. A voltage divider 335 is coupled to an output capacitance Co to generate a feedback detection signal FB according to the DC output voltage of the full-bridge converting circuit.

The full-bridge driving controller 300 comprises a feedback control circuit 310, a full-bridge driving circuit 320 and a protecting circuit 370. The feedback control circuit 310 generates a pulse width control signal PC according to the feedback detection signal FB. The full-bridge driving circuit 320 generates a first control signal S1, a second control signal S2, a third control signal S3 and a fourth control signal S4 to switch the first transistor switch M1, the second transistor switch M2, the third transistor switch M3 and the fourth transistor switch M4 respectively. The feedback control circuit 310 comprises an error amplifier 302, a comparator 304 and an on-time clocking circuit. An inverting input terminal of the error amplifier 302 receives the feedback detection signal FB, and a non-inverting input terminal thereof receives a reference voltage signal Vref to generate an error amplified signal. An inverting input terminal of the comparator 304 receives the error amplified signal, and a non-inverting input terminal thereof is coupled to the on-time clocking circuit to generate the pulse width control signal PC.

The on-time clocking circuit comprises an inverter 306, a NOR gate 308, a capacitance 309, a current source IS and switches Sw1, Sw2. The on-time clocking circuit is used to clock turn-on periods of a first conduction path and a second conduction path, and generates a timing signal. When the NOR gate 308 receives one of the second control signal S2 and the fourth control signal S4, the NOR gate 308 turns the switch Sw2 off and turns the switch Sw1 on through the inverter 306. At this time, the current source IS starts to charge the capacitance 309 to generate a timing signal. When the level of the timing signal is higher than that of the error amplified signal generated by the error amplifier 302, the comparator 304 generates the pulse width control signal PC, and thus the full-bridge driving circuit 320 cuts off the first conduction path and the second conduction path. At this time, the full-bridge driving circuit 320 stops generating the second control signal S2 and the fourth control signal S4, and thus the NOR gate 308 turns on the switch Sw2, and turns on the switch Sw1 through the inverter 306 to reset the timing signal, i.e., the voltage of the capacitance 309.

The full-bridge driving circuit 320 comprises a resonant frequency detecting circuit, a D-type flip-flop 315, SR flip-flops 316, 318, 326 and 328, and delay circuits 312, 322, 317 and 327. The full-bridge driving circuit 320 conducts the first conduction path and the second conduction path according to a preset switching sequence, and cuts off the first conduction path and the second conduction path in sequence according to the pulse width control signal PC. The resonant frequency detecting circuit, comprising comparators 311 and 321, is coupled to the resonant unit to detect a resonant current of the resonant unit, thereby detecting a state of the resonant unit and determining an operating frequency of the full-bridge driving circuit. Thereby, the operating frequency of the full-bridge driving circuit 300 is kept being higher than the resonant frequency of the resonant unit. An inverting input terminal of the comparator 311 receives a frequency detection reference signal Vfr, and a non-inverting input terminal thereof is coupled to a first input terminal L1 of the resonant unit to receive a first frequency detection signal Si1. An inverting input terminal of the comparator 321 receives the frequency detection reference signal Vfr, and a non-inverting input terminal thereof is coupled to a second input terminal L2 of the resonant unit to receive a second frequency detection signal Si2.

Referring to the FIG. 7(a) to FIG. 7(h), a default setting of the full-bridge driving controller 300 is to turn on the first conduction path at the beginning of the full-bridge converting circuit starting, i.e., outputting the first control signal S1 and the fourth control signal S4 at the beginning, to turn on the first transistor switch M1 and the fourth transistor switch M4 respectively. The comparator 311 and 321 are blanked for a preset blank period so as to avoid misjudgment at the beginning of the full-bridge driving controller 300. The D-type flip-flop 315 is triggered to output a high-level signal at an output terminal Q when the feedback control circuit 310 generates the pulse width control signal PC, and thus the SR flip-flop 326 stops generating the fourth control signal S4 at the output terminal Q to turn off the fourth transistor switch M4 and generates a high-level signal at an inverting output terminal Q'. The SR flip-flop 328 is triggered in a preset delay period of the delay circuit 327 to generate the third control signal S3 at the output terminal Q to turn on the third transistor switch M3. At this moment, the current of the resonant unit is decreased due to that the first conduction path cuts off, and thus the potential of the first input terminal L1 is raised. When the level of the first frequency detection signal Si1 is higher than the frequency detection reference signal Vfr, the comparator 311 generates and outputs a high-level signal to a reset terminal R of the SR flip-flop 318. At this time, the SR flip-flop 318 stops outputting the first control signal S1 at the output terminal Q to turn off the first transistor switch M1, and generates and outputs a high-level signal at the inverting output terminal Q' to the output terminal Q of the SR flip-flop 316 after a preset delay period of the delay circuit 312. Then, the SR flip-flop 316 generates the second control signal S2 to turn on the second transistor switch M2. At this time, the second conduction path is conducted.

When the feedback control circuit 310 generates the pulse width control signal PC again, the D-type flip-flop 315 is triggered to output a high-level signal at the inverting output terminal Q'. Then, the SR flip-flop 316 stops generating the second control signal S2 at the output terminal Q to turn off the second transistor switch M2, and generates a high-level signal at the inverting output terminal Q'. After a preset delay period of the delay circuit 317, the SR flip-flop 316 is triggered to generate a first control signal S1 to turn on the first transistor switch M1. Then, the current of the resonant is decreased due to the second conduction path being cut off, and so the potential of the second input terminal L2 is raised. When the level of the second frequency detection signal Si2 is higher than the level of the frequency detection reference signal Vfr, the comparator 321 generates and outputs a high-level signal to the reset terminal R of the SR flip-flop 328. The SR flip-flop 328 stops outputting the third control signal S3 at the output terminal Q to turn off the third transistor switch M3, and generates a high-level signal. After a preset delay period of the delay circuit 322, the SR flip-flop 326 generates the fourth control signal S4 at the output terminal Q to turn on the fourth transistor switch M4. Then, the first conduction path is conducted again.

The protecting circuit 370 comprises comparators 372, 374 and a logic element 376. The comparator 372 determines whether the DC output voltage of the full-bridge converting circuit is over-high according to the over-high voltage judgment signal Vovp and the voltage detection signal VFB generated by the voltage detection circuit 335. The comparator 374 determines whether the DC output voltage of the full-bridge converting circuit is over-low according to the over-low voltage judgment signal Vuvp and the voltage detection signal VFB. When the DC output voltage of the full-bridge converting circuit is over-high or over-low, the logic element 376 is notified to generate a logic judgment signal Pau to the full-bridge driving circuit 320 for stopping generating the first control signal S1, the second control signal S2, the third control signal S3 and the fourth control signal S4. Therefore, the first transistor switch M1, the second transistor switch M2, the third transistor switch M3 and the fourth transistor switch M4 are all turned off to stop transmitting the power to the secondary side of the resonant unit. The logic element 376 may also receive the dimming signal DIM on which is based to temporarily stop and restore the transmission of the power to the secondary side of the resonant unit for executing a dimming function.

The embodiment overlaps the turned-on periods of the first transistor switch M1 and the third transistor switch M3 (referring to FIG. 7(c) and FIG. 7(g)) to further decrease the switching loss of the full-bridge switching circuit. In general, the turn-on periods of the first transistor switch M1 and the third transistor switch M3 are longer than that of 50% duty cycle for overlapping the portions of turned-on periods of the first transistor switch M1 and the third transistor switch M3. Preferably, the first transistor switch M1 and the third transistor switch M3 have fixed duty cycles, such as 52%. The DC output voltage can be modulated by adjusting the duty cycles of the second transistor switch M2 and the fourth transistor switch M4.

Alternatively, the turned-on periods of the second transistor switch M2 and the fourth transistor switch M4 can be overlapped and the duty cycles of the first transistor switch M1 and the third transistor switch M3 can be adjusted for modulating the output power. The detail description of the circuit operation can be referred to the embodiment shown in FIG. 8, by exchanging the first transistor switch M1 and the second transistor switch M2, with the third transistor switch M3 and the fourth transistor switch M4.

Figure 9:
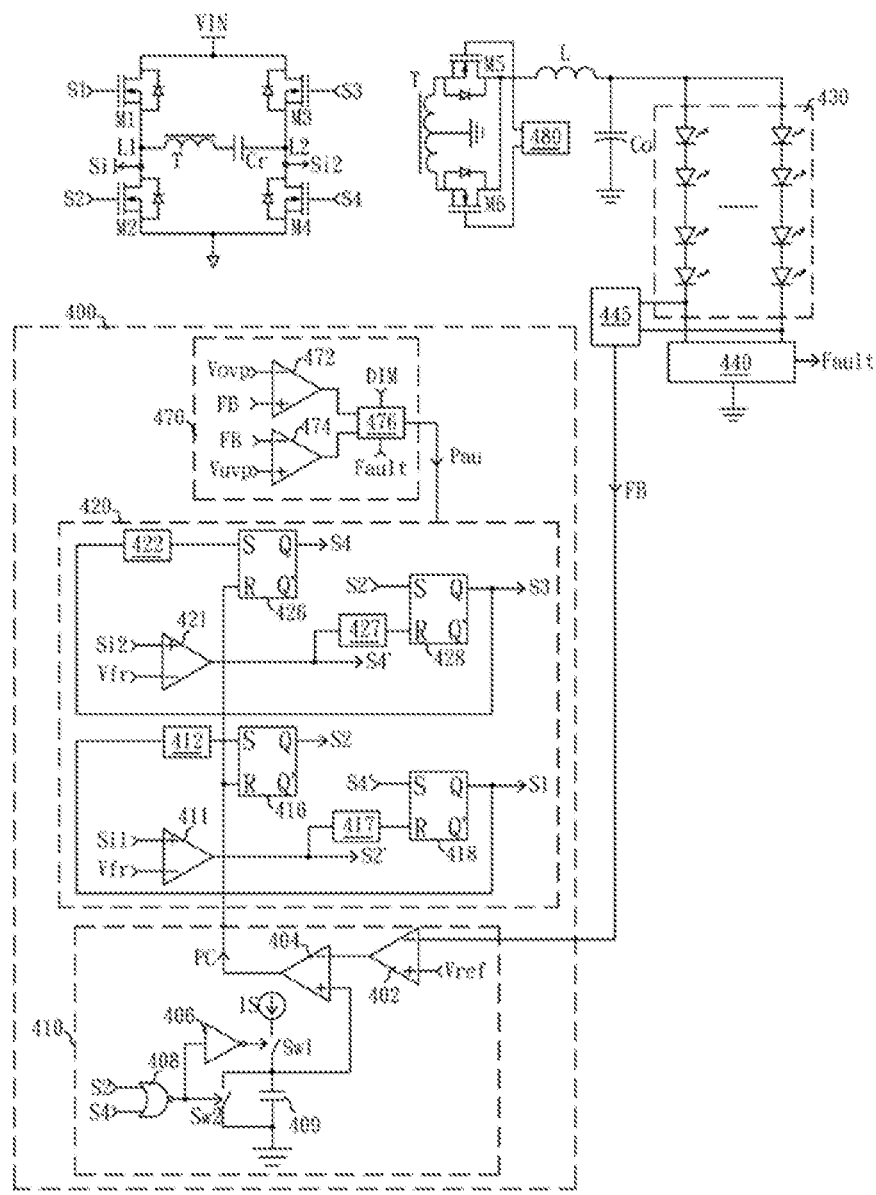
FIG. 9 is a schematic diagram of a full-bridge converting circuit according to another embodiment of the present invention.

FIG. 9 is a schematic diagram of a full-bridge converting circuit according to another embodiment of the present invention. Compared with the embodiment shown in FIG. 8, the main difference is that the turned-on time points of the third transistor switch M3 and the first transistor switch M1 are postponed. The detail explanation is described is as follows.

The full-bridge converting circuit which comprises a resonant unit, a full-bridge switching circuit, a rectification unit and a full-bridge driving controller 400, is adapted to convert an input power source VIN to a DC output voltage for driving an LED module 430 to emit light. The full-bridge switching circuit comprises a first transistor switch M1, a second transistor switch M2, a third transistor switch M3 and a fourth transistor switch M4. The resonant unit comprises a primary side comprising a resonant capacitance Cr, a primary side of a transformer T and a secondary side comprising a secondary side of the transformer T and a resonant inductance L. The rectification unit comprises a synchronous rectification controller 480, a fifth transistor switch M5, a sixth transistor switch M6 and an output capacitance Co. The connection relationships and the operations of the resonant unit, the full-bridge switching circuit and the rectification unit can be referred to the forgoing description. The LED module 430 comprises a plurality of LED strings, wherein each terminal of the LED string is coupled to the DC output voltage. A current balance unit 440 comprises a plurality of current balance terminals coupled to corresponding terminals of the LED strings to stabilize currents of the LED strings around a preset current value. A terminal voltage selecting element 445 is coupled to the current balance terminals of the current balance unit 440 to generate a feedback detection signal FB according to voltages of the current balance terminals.

The full-bridge driving controller 400 comprises a feedback controller 410, a full-bridge driving circuit 420 and a protecting circuit 470. The feedback controller 410 generates a pulse width control signal PC according to the feedback detection signal FB. The full-bridge driving circuit 420 generates a first control signal S1, a second control signal S2, a third control signal S3 and a fourth control signal S4 to switch the first transistor switch M1, the second transistor switch M2, the third transistor switch M3 and the fourth transistor switch M4 respectively. The feedback controller 410 comprises an error amplifier 402, a comparator 404 and an on-time clocking circuit. The on-time clocking circuit comprises an inverter 406, a NOR gate 408, a capacitance 409, a current source IS and switches Sw1, Sw2, and clocks the turned-on period of a first conduction path and a second conduction path to generate a timing signal. The connection relationship and the operation of the feedback controller 410 can be referred to the description shown in FIG. 8.

The full-bridge driving circuit 420 comprises a resonant frequency detecting circuit, SR flip-flops 416, 418, 426, 428 and delay circuits 412, 422, 417, 427. The full-bridge driving circuit 420 conducts the first conduction path and the second conduction path according to a preset switching sequence, and cuts off the first conduction path and the second conduction path according to the pulse width control signal PC. The resonant frequency detecting circuit comprises comparators 411, 421 coupled to the resonant unit to detect the resonant current of the resonant unit, and determines an operating frequency of the full-bridge driving circuit 400 to make the operating frequency of the full-bridge driving circuit 400 be higher than the resonant frequency of the resonant unit. An inverting input terminal of the comparator 411 is coupled to a frequency detection reference signal Vrf, and a non-inverting input terminal thereof is coupled to the first input terminal L1 to receive a first frequency detection signal Si1. An inverting input terminal of the comparator 421 is coupled to the frequency detection reference signal Vrf, and a non-inverting input terminal thereof is coupled to the second input terminal L2 of the resonant unit to receive a second frequency detection signal Si2.

A default setting of the full-bridge driving controller 400 is to turn on the first conduction path when the beginning of the full-bridge converting circuit starting. Therefore, the first control signal S1 and the fourth control signal S4 are outputted to turn on the first transistor switch M1 and the fourth transistor switch M4 at the beginning. In addition, the comparators 411, 421 are blanked for a preset blank period to avoid misjudgment at the beginning. When the feedback controller 410 generates the pulse width control signal PC, the SR flip-flop 426 is triggered to stop generating the fourth control signal S4 to turn off the fourth transistor switch M4, and thus the first conduction path is cut off. The comparator 411 outputs a switching signal S2' when the level of the first frequency detection signal Si1 is higher than the frequency detection reference signal Vrf due to the current of the resonant unit decreased by releasing energy stored therein. The switching signal S2' triggers the SR flip-flop 428 to output the third control signal S3 to turn on the third transistor switch M3. The delay circuit 417 receives the switching signal S2' and resets the SR flip-flop 418 in a preset delayed period, and thus the SR flip-flop 418 stops outputting the first control signal S1 to turn off the first transistor switch M1. The delay circuit 412 detects a falling edge of the first control signal S1 and triggers the SR flip-flop 416 to output the second control signal S2 to turn on the second transistor switch M2 after a preset delay period when detecting the falling edge of the first control signal S1. The second conduction path is turned on at this time. When the feedback control signal 410 generates the pulse width control signal PC again, the feedback control signal 410 triggers the SR flip-flop 416 to stop generating the second control signal S2 to turn off the second transistor switch M2. The second conduction path is cut off at this time. The comparator 421 outputs a switching signal S4' when the level of the first frequency detection signal Si2 is higher than the frequency detection reference signal Vrf due to the current of the resonant unit decreased by releasing energy stored therein. The switching signal S4' triggers the SR flip-flop 418 to output the first control signal S1 to turn on the first transistor switch M1. The delay circuit 427 receives the switching signal S4' and resets the SR flip-flop 428 in a preset delayed period, and thus the SR flip-flop 428 stops outputting the third control signal S3 to turn off the third transistor switch M3. The delay circuit 422 detects the falling edge of the third control signal S3, so as to trigger the SR flip-flop 426 to output the fourth control signal S4 to turn on the fourth transistor switch M4 when detecting the falling edge of the third control signal S3. At this time, the first conduction path is conducted again.

The protecting circuit 470 comprises comparators 472, 474 and a logic element 476. The comparators 472 and 474 notify the logic element 476 to enter a protection mode when determining that the lowest voltage among the current balance terminals of the balance current unit 440 is out of a preset voltage range according to an over-high voltage judgment signal Vovp, an over-low voltage judgment signal Vuvp and an feedback detection signal FB generated by the terminal voltage select element 445. The balance current unit 440 generates and outputs a fault signal Fault to the logic element 476 when detecting an abnormal condition occurring, and thus the logic element 476 also enter the protection mode. Besides, the logic element 476 may receive the dimming signal DIM to stop or restore the transmission of the power to the secondary side of the resonant unit for executing dimming function.

Figure 10:
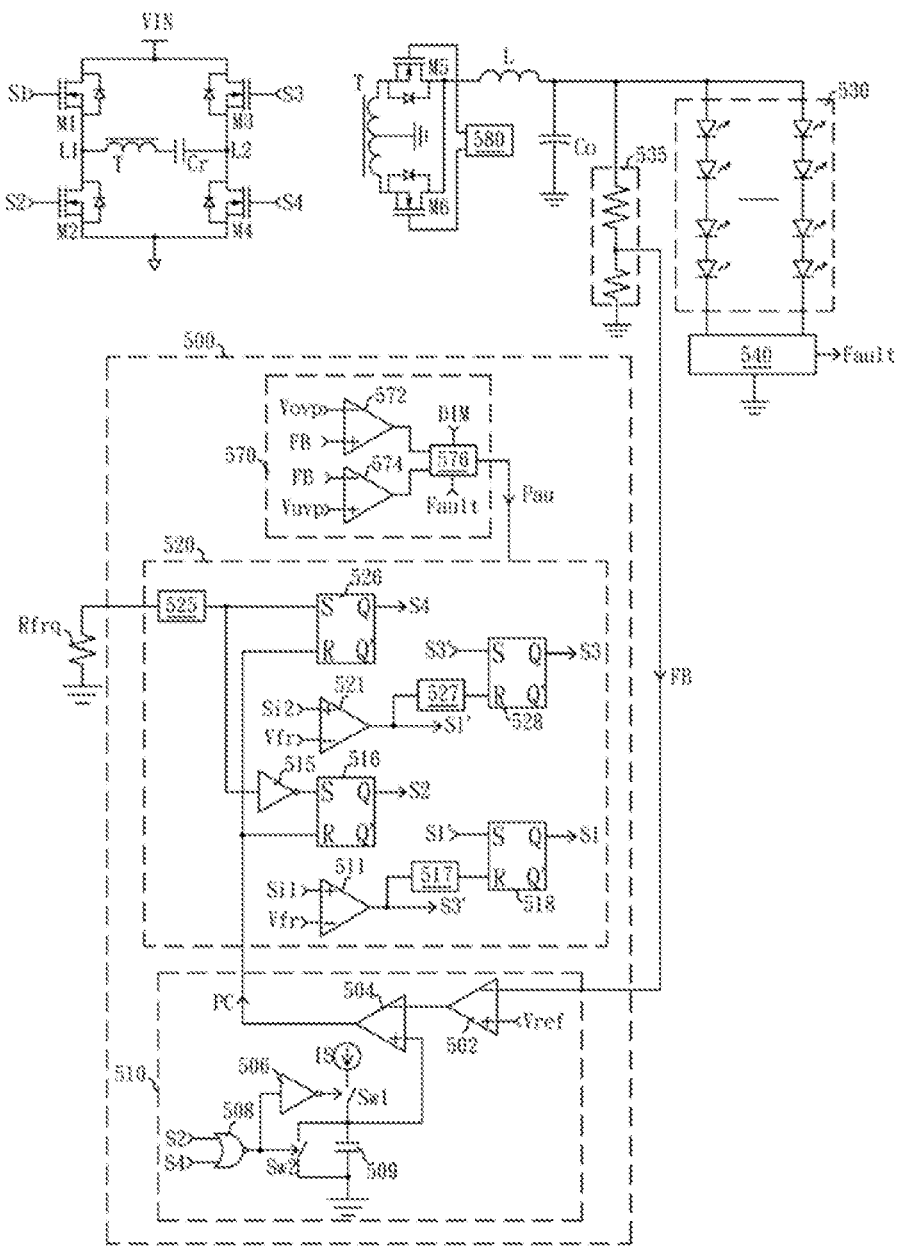
FIG. 10 is a schematic diagram of a full-bridge converting circuit according to another embodiment of the present invention.

FIG. 10 is a schematic diagram of a full-bridge converting circuit according to another embodiment of the present invention. Compared with the embodiment shown in FIG. 9, the main difference is that the embodiment uses the frequency generator to substitute the resonant frequency detecting circuit. The electromagnetic disturbance (EMI) in the circuit can be filtered out easily. Moreover, an abnormal switching of transistor switched due to a misjudge of resonant frequency detecting circuit also can be avoided. The detail explanation is described as follows.

The full-bridge converting circuit, which comprises a resonant unit, a full-bridge switching circuit, a rectification unit and a full-bridge driving controller 500, is adapted to convert an input power source VIN into a DC output voltage to provide the power to an LED module 530 for emitting light. The full-bridge switching circuit comprises a first transistor switch M1, a second transistor switch M2, a third transistor switch M4 and a fourth transistor switch M4. The resonant unit comprises a primary side comprising a resonant capacitance Cr and a primary side of a transformer T, and a secondary side comprising a secondary side of the transformer T and a resonant inductance L. The rectification unit comprises a synchronous rectification controller 580, a fifth transistor switch M5, a sixth transistor switch M6 and an output capacitance Co. The connection relationship and the operation of the resonant unit, the full-bridge switching circuit and the rectification unit can be referred to the forgoing descriptions and are not described herein again. The LED module 530 comprises a plurality of LED strings, wherein one terminal of each LED string is coupled to the DC output Voltage. A current balance unit 540 comprises a plurality of current balance terminals coupled to another terminal of LED strings to stabilize currents of each LED string around a preset current. The current balance unit 540 generates a fault signal Fault while detecting abnormal current or voltage of any one of the current balance terminals. A voltage detecting circuit 535 is coupled to the output capacitance Co to generate a feedback detection signal FB according to the DC output voltage of the full-bridge converting circuit.

The full-bridge driving controller 500 comprises a feedback controller 510, a full-bridge driving circuit 520 and a protecting circuit 570. The feedback controller 510 generates a pulse width control signal PC according to the feedback detection signal FB. The full-bridge driving circuit 520 generates a first control signal S1, a second control signal S2, a third control signal S3 and a fourth control signal S4 to switch the first transistor switch M1, the second transistor switch M2, the third transistor switch M3 and the fourth transistor switch M4 respectively. The feedback controller 510 comprises an error amplifier 502, a comparator 504 and an on-time clocking circuit. The on-time clocking circuit, which comprises an inverter 506, a NOR gate 508, a capacitance 509, a current source IS and switches Sw1, Sw2, is used to clock the turned-on periods of the first conduction path and the second conduction path, and a timing signal is generated accordingly. The connection relationship and the operation of the feedback controller 510 can be referred to the description shown in FIG. 8.

The full-bridge driving circuit 520 comprises an inverter 515, a frequency generator 525, SR flip-flops 516, 518, 526, 528, and delay circuits 517, 527. The full-bridge driving circuit 520 conducts the first conduction path and the second conduction path according to the preset switching sequence, and cuts off the first conduction path and the second conduction path according to the pulse width control signal PC. The frequency generator 525 generates a clock signal and is coupled to a frequency set element Rfrq to determine a frequency of the clock signal, thereby enabling an operating frequency of the full-bridge driving circuit 500 to be higher than the resonant frequency of the resonant unit. The pulse width of the clock signal generated by the frequency generator 525 is 50%. The frequency generator 525 is coupled to a set terminal S of the SR flip-flop 526, and is coupled to a set terminal S of the SR flip-flop 516 via the inverter 515 so as to trigger the full-bridge driving circuit 520 to generate the fourth control signal S4 and the second control signal S2 respectively. Other operations of the full-bridge driving circuit 520 can be referred to the full-bridge driving circuit 420 shown in FIG. 9 and are not described again herein.

The protecting circuit 570 comprises comparators 572, 574 and a logic element 576. The comparators 572 and 574 notifies the logic element 576 to enter a protection mode when the DC output voltage outputted by the full-bridge converting circuit is out of a preset voltage range according to an over-high voltage adjust Vovp, an over-low voltage judgment signal Vuvp and a feedback detection signal FB generated by the voltage detecting circuit 535. The logic element 576 is also coupled to the current balance unit 540 and enters the protection mode when receiving the fault signal Fault generated by the current balance unit 540. Besides, the logic element 576 may receive the dimming signal DIM to stop or restore the transmission of the power to the secondary side of the resonant unit for executing a dimming function.

Figure 11:
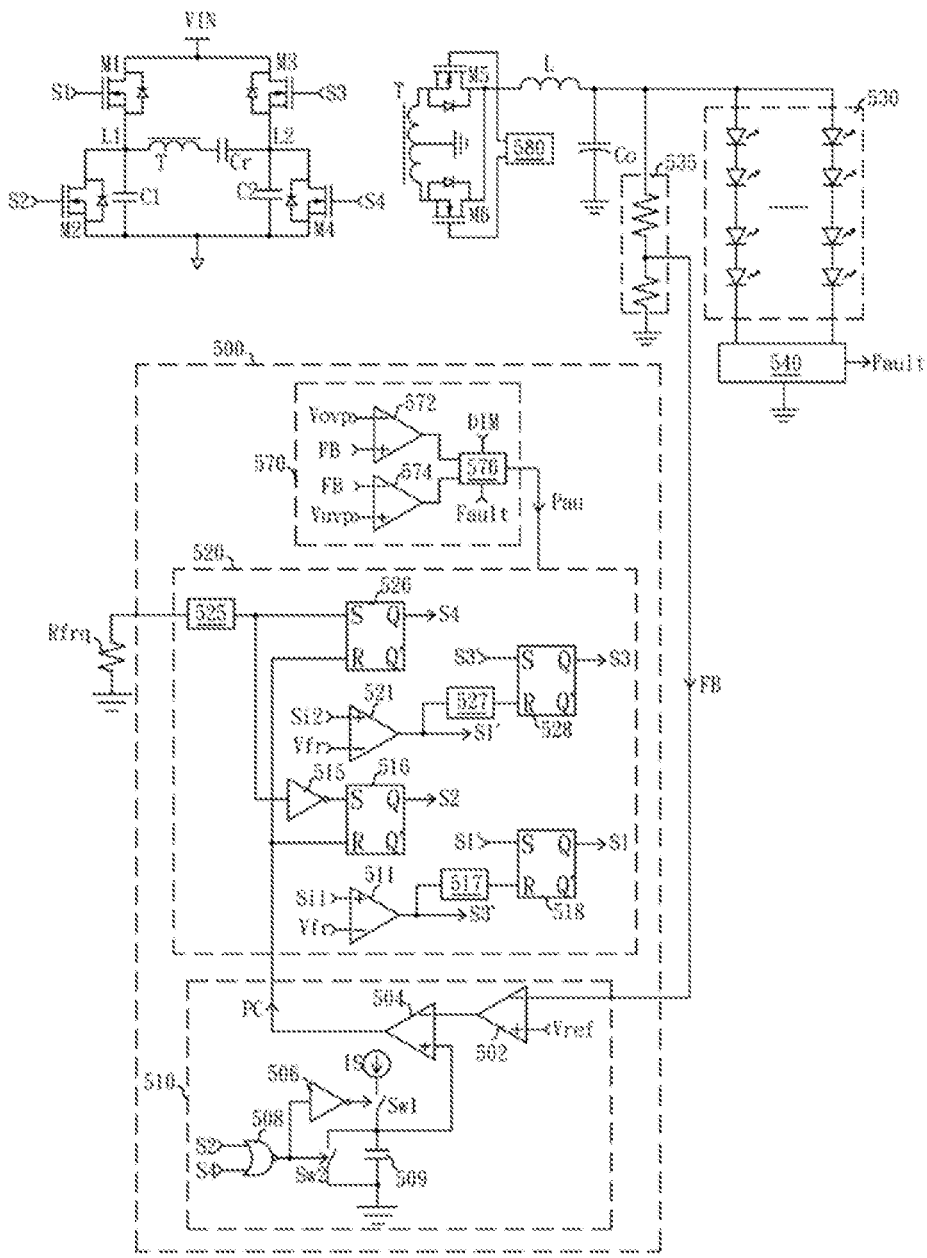
FIG. 11 is a schematic diagram of a circuit of FIG. 10 with addition of a soft switching capacitance according to the present invention.

All transistor switches are not turned off by soft switching in the aforementioned embodiments. For example, the second transistor switch M2 and the fourth transistor switch M4 are still turned off by hard switching. Capacitances can be connected with the second transistor switch M2 and the fourth transistor switch M4 in parallel to achieve the function of soft switching. FIG. 11 is a schematic diagram of a circuit with the soft switching capacitance according to the present invention. Soft switching capacitances C1, C2 are respectively connected in parallel with the second transistor switch M2 and the fourth transistor switch M4. Thereby, a voltage difference between a source gate and a drain gate of each of the second transistor switch M2 and the fourth transistor switch M4 is kept around a preset range during a period from being turned on to being turned off. Therefore, the switching loss due to the second transistor switch M2 and the fourth transistor switch M4 is further reduced. The operation of other circuits in the present embodiment can be referred to the description shown with FIG. 10. Of course, the soft switching capacitances may be connected in parallel with the first transistor switch M1 and the third transistor switch M3 when the turned-on periods of the second transistor switch M2 and the fourth transistor switch M4 are overlapped.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A full-bridge converting circuit, adapted to provide a DC output voltage, the full-bridge converting circuit comprising:
   a resonant unit having a primary side and a secondary side;
   a first transistor switch coupled to an input power source and a first terminal of the primary side;
   a second transistor switch coupled to the first terminal of the primary side and a common potential;
   a third transistor switch coupled to the input power source and a second terminal of the primary side;

a fourth transistor switch coupled to the second terminal of the primary side and the common potential;

a rectification unit coupled to the secondary side of the resonant unit for rectifying power of the resonant unit to output the DC output voltage; and a full-bridge driving controller adapted to switch the first transistor switch, the second transistor switch, the third transistor switch and the fourth transistor switch at an operating frequency, thereby enabling the first transistor switch and the second transistor switch to be turned on at different time periods and the third transistor switch and the fourth transistor switch to be turned on at different time periods, wherein the operating frequency is higher than a resonant frequency of the resonant unit, wherein the full-bridge driving controller turns off one of the second transistor switch and the third transistor switch when a current flowing through the second transistor switch and the third transistor switch which are turned on is detected to be smaller than a preset current value.

2. The full-bridge converting circuit according to claim 1, wherein the full-bridge driving controller comprises a resonant frequency detecting circuit, wherein the resonant frequency detecting circuit is coupled to the resonant unit for detecting a resonant voltage or a resonant current of the resonant unit to adjust the operating frequency.

3. The full-bridge converting circuit according to claim 2, wherein one of the first transistor switch and the second transistor switch is turned on after a preset period when the other one of the first transistor switch and the second transistor switch is turned off, and one of the third transistor switch and the fourth transistor switch is turned on after a preset period when the other one of the third transistor switch and the fourth transistor switch is turned off.

4. The full-bridge converting circuit according to claim 1, wherein the full-bridge driving controller turns off one of the first transistor switch and the fourth transistor switch when a current flowing through the first transistor switch and the fourth transistor switch which are turned on is detected to be smaller than a preset current value.

5. The full-bridge converting circuit according to claim 3, wherein respective turned-on periods of the first transistor switch and the third transistor switch are fixed or respective turned-on periods of the second transistor switch and the fourth transistor switch are fixed.

6. The full-bridge converting circuit according to claim 1, wherein the full-bridge driving circuit comprises an input voltage detecting circuit and a ramp generator, wherein the input voltage detecting circuit generates an amplitude adjustment signal according to the input power source, and the ramp generator generates a ramp signal with amplitude in response to the amplitude adjustment signal.

7. The full-bridge converting circuit according to claim 1, further comprising an LED module coupled to the rectification unit, wherein the full-bridge driving controller controls the first transistor switch, the second transistor switch, the third transistor switch and the fourth transistor switch according to the DC output voltage, wherein the full-bridge driving controller turns off the first transistor switch, the second transistor switch, the third transistor switch and the fourth transistor switch simultaneously when the DC output voltage is higher than an over-high voltage value or lower than an over-low voltage value, and the over-high voltage value is higher than the undervoltage value.

8. The full-bridge converting circuit according to claim 1, further comprising an LED module and a current balance unit, the LED module is coupled to the rectification unit and comprising a plurality of LED strings, the current balance unit comprising a plurality of current balance terminals coupled to the plurality of LED strings for balancing currents flowing through the LED strings, wherein the full-bridge driving controller switches the first transistor switch, the second transistor switch, the third transistor switch and the fourth transistor switch according to respective voltages of the current balance terminals.

9. The full-bridge converting circuit according to claim 8, wherein the rectification unit comprises a synchronous rectification controller and two transistor switches coupled to the secondary side of the resonant unit, and the synchronous rectification controller switches the two transistor switches according to a voltage of the secondary side of the resonant unit, a current of the secondary side or a combination thereof.

10. The full-bridge converting circuit according to claim 1, further comprising a first capacitance and a second capacitance, wherein the first capacitance is connected with the first transistor switch in parallel and the second capacitance is connected with the third transistor switch in parallel, or the first capacitance is connected with the second transistor switch in parallel and the second capacitance is connected with the fourth transistor switch in parallel.

11. A full-bridge driving controller, comprising:

a feedback controller for generating a pulse width control signal according to a feedback detection signal; and a full-bridge driving circuit for generating a first control signal, a second control signal, a third control signal and a fourth control signal according to the pulse width control signal to respectively switch a first transistor switch, a second transistor switch, a third transistor switch and a fourth transistor switch in a full-bridge switching circuit, wherein the first transistor switch and the fourth transistor switch determines a first conduction path, and the second transistor switch and the third transistor switch determines a second conduction path, and the first transistor switch and the second transistor switch are connected in series between an input power source and a common potential, and the third transistor switch and the fourth transistor switch are connected in series between the input power source and the common potential;

wherein the full-bridge driving circuit turns on one of the second transistor switch and the third transistor switch after the first conduction path is cut off, and turns on one of the first transistor switch and the fourth transistor switch after the second conduction path is cut off, wherein the first transistor switch and the second transistor are turned on at different time periods and the second transistor switch and the third transistor switch are turned on at different time periods, wherein the full-bridge driving circuit turns off one of the second transistor switch and the third transistor switch when a current flowing through the second transistor switch and the third transistor switch which are turned on is detected to be smaller than a preset current value.

12. The full-bridge driving controller according to claim 11, further comprising a resonant frequency detecting circuit, wherein the resonant frequency detecting circuit is coupled to a resonant unit for detecting a resonant current of the resonant unit to determine an operating frequency of the full-bridge driving circuit.

13. The full-bridge driving controller according to claim 12, further comprising a protecting circuit which receives an output voltage detection signal indicative of an output voltage provided by the resonant unit and generates a protection signal to stop the full-bridge driving circuit from outputting the first control signal, the second control signal, the third control signal and the fourth control signal when a level of the output voltage detection signal is higher than an over-high voltage value or lower than an over-low voltage value.

14. The full-bridge driving controller according to claim 11, wherein the feedback control circuit comprises an on-time clocking circuit and an error amplifier, wherein the error amplifier generates an error amplified signal according to the feedback detection signal, and the on-time clocking circuit clocks time periods when the first conduction path and the second conduction path are turned on and generates a timing signal, and the feedback control circuit generates the pulse width control signal according to the error amplified signal and the timing signal.

15. A full-bridge driving controller, comprising:
a feedback controller for generating a pulse width control signal according to a feedback detection signal;
a frequency generator for generating a clock signal; and
a full-bridge driving circuit for generating a first control signal, a second control signal, a third control signal and a fourth control signal according to the pulse width control signal and the clock signal to respectively switch a first transistor switch, a second transistor switch, a third transistor switch and a fourth transistor switch in a full-bridge switching circuit, wherein the first transistor switch and the fourth transistor switch determines a first conduction path, and the second transistor switch and the third transistor switch determines a second conduction path, and the first transistor switch and the second transistor switch are connected in series between an input power source and a common potential, and the third transistor switch and the fourth transistor switch are connected in series between the input power source and the common potential;
wherein the full-bridge driving circuit turns on one of the second transistor switch and the third transistor switch after the first conduction path is cut off and turns on one of the first transistor switch and the fourth transistor switch after the second conduction path is cut off, wherein the first transistor switch and the second transistor are turned on at different time periods and the second transistor switch and the third transistor switch are turned on at different time periods,
wherein the full-bridge driving circuit turns off one of the second transistor switch and the third transistor switch when a current flowing through the second transistor switch and the third transistor switch which are turned on is detected to be smaller than a preset current value.

16. The full-bridge driving controller according to claim 15, further comprising a frequency set unit coupled to the frequency generator, wherein the frequency generator adjusts a frequency of the clock signal according to the frequency set unit.

17. The full-bridge driving controller according to claim 16, further comprising an input voltage detecting circuit for detecting the input power source to generate an amplitude adjustment signal, wherein the frequency generator generates a ramp signal with amplitude in response to the amplitude adjustment signal, and the full-bridge driving controller generates the first control signal, the second control signal, the third control signal and the fourth control signal according to the ramp signal.

18. The full-bridge driving controller according to claim 16, further comprising a protecting circuit for receiving an output voltage detection signal indicative of an output voltage provided by a resonant unit and generating a protection signal to stop the full-bridge driving circuit from outputting the first control signal, the second control signal, the third control signal and the fourth control signal when a level of the output voltage detection signal is higher than a preset over-high voltage value or is lower than a preset over-low voltage value.

19. The full-bridge driving controller according to claim 16, wherein the first control signal and the third control signal have fixed duty cycles, or the second control signal and the fourth control signal have fixed duty cycles.

* * * * *